INVENTOR.
LAWRENCE S. COLE
BY R H Quist
ATTORNEY.

Dec. 22, 1970 L. S. COLE 3,550,114

PREWIRED ADDRESS SEQUENCER FOR SUCCESSIVE APPROXIMATION ANALOG-TO-DIGITAL CONVERTERS

Filed Dec. 22, 1967 2 Sheets-Sheet 2

INVENTOR.
LAWRENCE S. COLE

BY R H Quist

ATTORNEY.

United States Patent Office 3,550,114

Patented Dec. 22, 1970

3,550,114

PREWIRED ADDRESS SEQUENCER FOR SUCCESSIVE APPROXIMATION ANALOG-TO-DIGITAL CONVERTERS

Lawrence S. Cole, Ormond Beach, Fla., assignor to General Electric Company, a corporation of New York Filed Dec. 22, 1967, Ser. No. 692,860
Int. Cl. H04q *3/14;* H03k *13/14*
U.S. Cl. 340—347 1 Claim

ABSTRACT OF THE DISCLOSURE

The sequencer in a successive approximation analog-to-digital converter is also used for address recognition capability. An address in binary code is sent by an interrogator to all converters in the system bit by bit. Each bit is compared by the converters with the corresponding bit of its prewired address utilizing the sequencer to initiate comparisons. The converter being addressed then sends its converted information back to the interrogating source.

BACKGROUND OF THE INVENTION

This invention relates generally to analog-to-digital converters, and more particularly to a successive approximation analog-to-digital converter having an address recognition capability.

Integrated data systems have been developed wherein the conditions of various pieces of equipment at remote locations are monitored at a central point. Typically each equipment is provided with one or more sensors or transducers which produce analog potentials representative of the pressures, fluid flows, strains, etc., in the equipment. These analog potentials are converted to digital signals for transmission. In the more sophisticated systems, rather than have separate wires bring the signals from each transducer to the central point, time multiplexing is utilized so that a single wire or a pair of wires can serve for a number of transducers. Ordinarily, the information is delivered from the various converter units in accordance with a fixed sequence enabling the information to be identified with its source when received at the central point. In some situations, however, it becomes desirable to monitor a particular equipment more frequently or out of sequence, e.g., when a defect appears to have developed.

SUMMARY OF THE INVENTION

It is an object of this invention to employ the sequencer of a successive approximation analog to digit converter to provide an address recognition capability.

In a preferred form of the invention, a successive approximation analog to digital converter is wired with a unique address in binary form. The same sequencer used in the converter for the purpose of initiating approximation measurements is utilized to compare, bit by bit, addresses received by the converter with the address of the particular converter. When an address match is made, the address recognition circuitry enables the converter so that its conversion information will be transmitted.

DESCRIPTION OF THE PREFERRED EMBODIMENT

Figure 1:
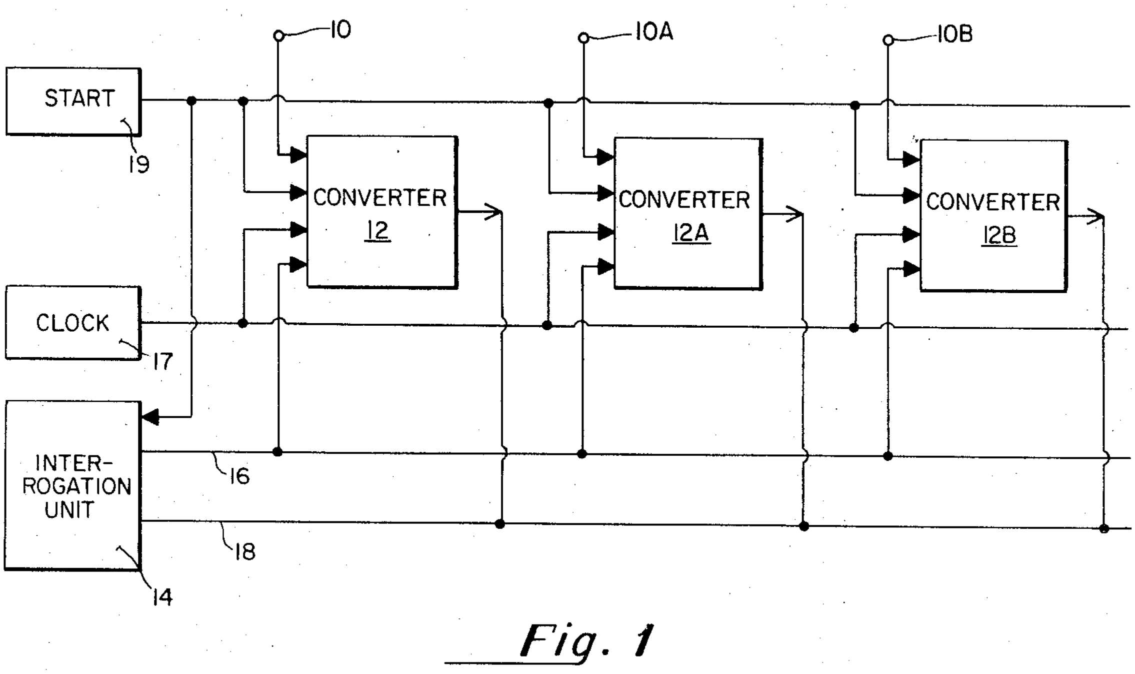
FIG. 1 is a schematic diagram of a system incorporating converters of the type of this invention.

Referring to FIG. 1, an integrated data system is illustrated. Connected to terminals 10, 10A, 10B, etc., are sensors and transducers which typically produce an analog potential indicative of the state of a piece of equipment or the like. The outputs of the transducers are delivered to converter units 12, 12A, 12B, etc., which translate the analog potentials by means of successive approximation to digital values. Interrogation unit 14 is connected to converters 12, by command line 16 and return line 18. A single line may be used for both these functions, and interrogation unit 14 might be connected to converters 12 by a radio link. Interrogation unit 14 may include display units and/or computer units to utilize the information acquired from converters 12. Synchronization of the system elements is achieved by clock 17, supplemented by start unit 19 which initiates new conversion cycles. Clock and start data could also be sent over command line 16.

The system as so far described commonly provides for delivering the information to interrogation unit 14 in a predetermined order, e.g., first 12, then 12A, then 12B, etc., which is repeated at the completion of the series. In some cases, however, it may be desired to incorporate into the system (perhaps as an additional mode of operation) the capability of interrogating particular converter units when desired. In this case, each of converter units 12 is provided with a different address. Interrogation unit 14 then transmits over command line 16 the address of a particular converter which responds with information about the equipment to which it is connected.

Figure 2:
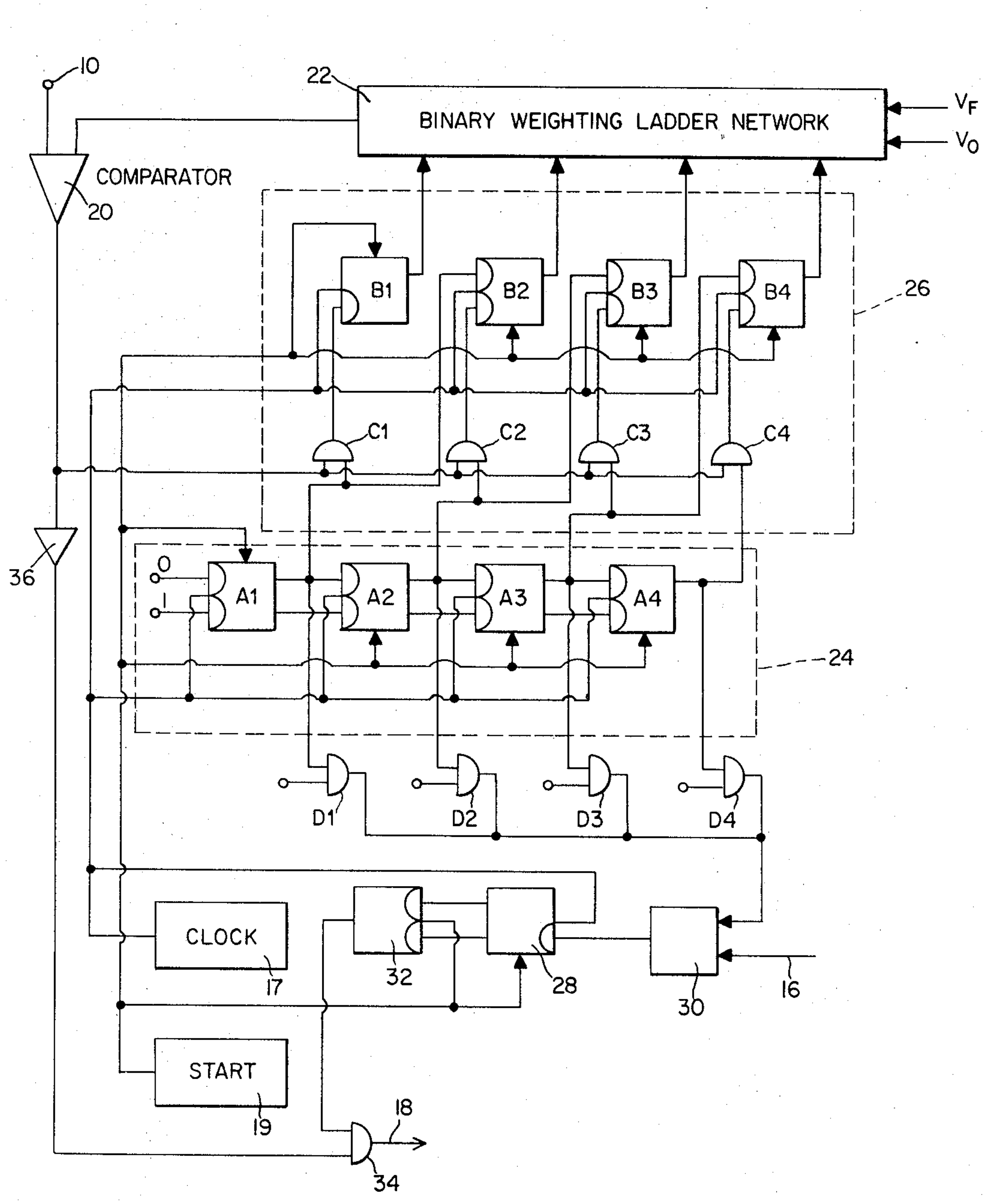
FIG. 2 is a schematic diagram of a converter in accordance with this invention.

Referring next to FIG. 2, a single successive approximation analog-to-digital converter unit 12 of FIG. 1 will be further described. Terminal 10 receives an analog potential which is applied as one input to comparator 20. Comparator 20, which also receives as an input an analog potential from binary weighting ladder network 22, is of the type having two output states. Which of the two states will be delivered depends on which of the two inputs is greater.

As is customary, ladder network 22 delivers to comparator 20 tests analog signals of various magnitudes which are compared with analog signal 10. The first test analog signal produced by ladder network 22 is one half of the maximum or full scale value available. The full scale and zero scale values are established by full scale $V_F$ and zero scale $V_0$ reference voltages applied to the ladder network. The output state of comparator 20 indicates whether analog signal 10 is greater or less than the first test signal. If analog signal 10 is greater, holding register 26 will be caused to retain a binary one as the first and most significant bit of the digital value of the analog signal. If analog signal 10 is less holding register will retain a binary zero as the first bit. A second test signal is then delivered to comparator 20. The second signal adds to the result of the first signal (which will be either one half full scale or zero), one quarter of the full scale value. Again the comparator determines whether analog signal 10 is greater or less than the test signal, and therefore whether the second bit is to be a binary one or zero. In a similar manner a third test signal is established testing the addition of a one eighth full scale value to the established first and second values. This determines the third bit of the digital conversion. In the illustrated embodiment the fourth and final bit would be developed by utilizing a one sixteenth full scale increment, but additional stages can be provided to achieve a closer approximation.

Sequencer (shift register) 24 comprising flip flops A1 through A4 is employed to control the comparison process. The timing of the process (illustrated in FIG. 3) is dependent on start signals from start unit 19, and clock pulses from clock 17.

At each start signal, flip flop A1 is set to deliver a binary one, while flip flops A2 through A4 deliver binary zeros. With each clock pulse, the binary one is delivered by the next flip flop in the sequencer. Flip flop A1 is switched to a zero output state at the first clock pulse by the steering inputs indicated. Also at each start signal, flip flop B1 of holding register 26 is set to deliver a binary one to ladder network 22, while flip flops B2 through B4 deliver binary zeros. If the first test analog signal is greater than analog signal 10, comparator 20 will produce a binary one output which is applied to AND gate C1 together with the binary one produced by flip flop A1 to change flip flop B1 to a zero output state. On the other hand, if the first test analog signal is less than analog signal 10, it is desired to retain flip flop B1 in the one output state. In this case, comparator 20 will deliver a zero output so that AND gate C1 will not produce a switching signal.

The one output of flip flop A1 is also applied to flip flop B2 so that at the next clock pulse this flip flop will deliver a binary one to ladder network 22. This sequencer 24 causes successive production of binary ones by the flip flops of holding register 26. When the sequence has been completed it would be possible to read out the encoded digital representation of analog signal 10 from holding register 26. As will be described however, a dfferent approach may be used.

In accordance with this invention, the foregoing successive approximation analog-to-digital converter is provided with an address recognition capability. Each of the converters 12 of FIG. 1 is assigned a different address constituting, in this example, four bits, in binary form. Referring again to FIG. 2, AND gates D1 through D4 are provided which receive as one input, in a sequential manner, the binary one which shifts through sequencer 24. The other inputs of AND gates D1 through D4 will be prewired to either binary ones or zeros, with a different combination of address for each of the analog to digital converters in the system.

Coincidentally with the start pulse test, flip flop 28 is set, and the first bit of serial address in sent over command line 16 to exclusive OR gate 30. At the same time (as described before), flip flop A1 produces a binary one which is delivered to AND gate D1. If the address of the converter of FIG. 2 had as its first bit a binary one, the other input of AND gate D1 would also be a one, and AND gate D1 would deliver a binary one to exclusive OR gate 30. With each succeeding clock pulse another bit of the address is sent and compared with the output of the next AND gate (D2 through D4). An output is produced by exclusive OR gate 30 only if any two inputs during its four bit address do not match; i.e., if this particular converter is not addressed. Such an output causes test flip flop 28 to be reset until the next start pulse is received. This situation is illustrated in FIG. 3, where the wave form of test flip flop 28 is shown as changing state after the first bit of the second address shown.

If at the completion of the address, test flip flop 28 has not been reset, flip flop 32 is put in the unit enable state at the next start pulse. A binary one is therefore delivered to AND gate 34 at the next start pulse. This permits the four bit output from comparator 20 to be delivered to return line 18.

Figure 3:
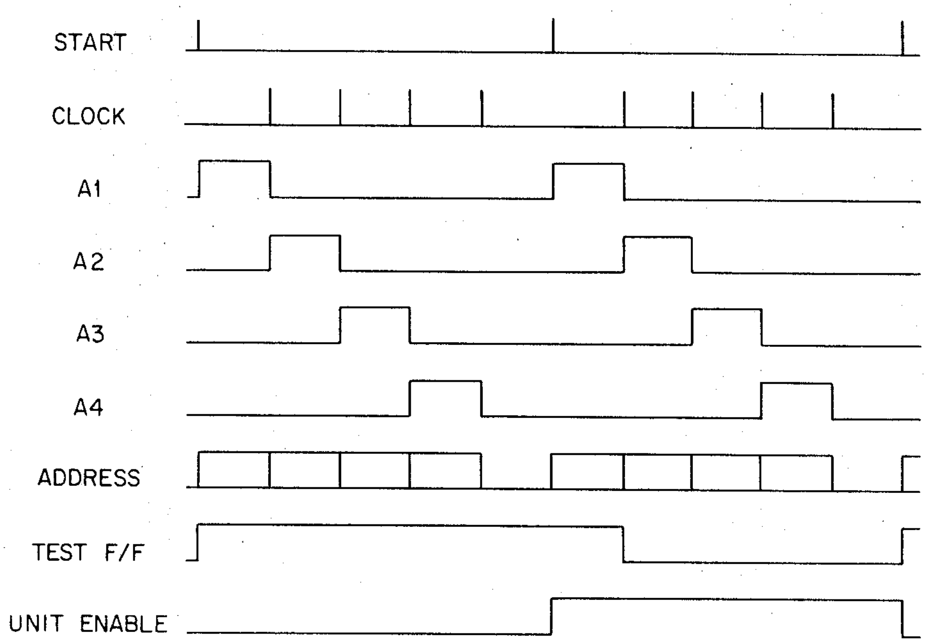
FIG. 3 is a timing diagram showing the sequence of events in various parts of the circuit of FIG. 2.

The four bit output delivered is not that developed in the previous conversion cycle, but rather, that produced beginning with the previously mentioned next start pulse (in FIG. 3 this would be the second cycle illustrated). Inverter 36 is utilized to convert the output of comparator 20 so that a one will be delivered to AND gate 34 when a one is retained in holding reigster 26.

While a particular embodiment of an integrated data system has been shown and described, it will be obvious that changes and modifications can be made without departing from the spirit of the invention and the scope of the appended claim.

What is claimed is:

1. In a successive approximation analog to digital con-converter having a sequencer comprising a plurality of flip flop elements which sequentially produce a binary one output, the improvement comprising:

a plurality of AND gates each having one input connected to the output of an associated flip flop element of said sequencer, and the other input connected to a source of signals which have a value of either a fixed binary one or a fixed binary zero;

an exclusive OR gate having one input connected to the outputs of said AND gates, and the other input connected to a source of a serial binary address;

a test flip flop connected to the output of said exclusive OR gate; and an enable flip flop connected to the output of said test flip flop and adapted to cause a delivery of conversion information upon being enabled.

References Cited

UNITED STATES PATENTS

| | | | |
|---|---|---|---|
| 3,045,210 | 7/1962 | Langley | 340—150 |
| 3,300,759 | 1/1967 | Chapman et al. | 340—150 |
| 3,463,911 | 8/1969 | Dupraz et al. | 340—147X |

MAYNARD R. WILBUR, Primary Examiner

M. K. WOLENSKY, Assistant Examiner

U.S. Cl. X.R.

340—150, 151